United States Patent [19]

Honma

[11] Patent Number: 5,546,133
[45] Date of Patent: Aug. 13, 1996

[54] IMAGE SIGNAL PROCESSING APPARATUS USING SIMPLIFIED D/A CONVERSION

[75] Inventor: Yoshihiro Honma, Tokyo, Japan

[73] Assignee: Canon Kabushiki Kaisha, Tokyo, Japan

[21] Appl. No.: 440,888

[22] Filed: May 15, 1995

Related U.S. Application Data

[63] Continuation of Ser. No. 898,839, Jun. 15, 1992.

[30] Foreign Application Priority Data

Jun. 19, 1991 [JP] Japan ..................................... 3-147389

[51] Int. Cl.⁶ ........................................................ H04N 9/65
[52] U.S. Cl. ............................ 348/642; 348/708; 358/310
[58] Field of Search ..................................... 348/488, 491, 348/493, 708, 713, 642, 572; 358/310; H04N 9/65, 11/08, 11/14

[56] References Cited

U.S. PATENT DOCUMENTS

| | | | |
|---|---|---|---|
| 4,347,619 | 8/1992 | Dakin et al. | 348/642 X |
| 4,941,054 | 7/1990 | Muramoto | 358/310 |
| 5,062,004 | 10/1991 | Winterer et al. | 358/310 |
| 5,155,600 | 10/1992 | Maeda | 358/310 |

*Primary Examiner*—Victor R. Kostak
*Attorney, Agent, or Firm*—Robin Blecker, Daley & Driscoll

[57] ABSTRACT

An image signal processing apparatus is arranged to convert input analog color-difference signals into digital color-difference signals, form a digital chrominance signal by using the digital color-difference signals, multiplex the formed digital chrominance signal onto the digital color-difference signals, convert the formed digital signal into an analog signal, and separate the analog signal into color-difference signals and a chrominance signal. With this arrangement, it is possible to simplify the arrangement of the apparatus and reduce the size, weight and cost thereof.

20 Claims, 3 Drawing Sheets

IMAGE SIGNAL PROCESSING APPARATUS USING SIMPLIFIED D/A CONVERSION

This is a continuation application under 37 CFR 1.62 of prior application Ser. No. 07/898,839, filed Jun 15, 1992.

BACKGROUND OF THE INVENTION

1. Field of the Invention

The present invention relates to an image signal processing apparatus for processing an image signal.

2. Description of the Related Art

Electronic still video cameras arranged to record a still image signal on a video floppy disc which is a magnetic disc have heretofore been known as one type of apparatus for processing an image signal.

Some of the electronic still video cameras include memory devices, and are arranged to temporarily store in the memory device a still image signal supplied from a video camera part or external equipment such as a still video reproducing apparatus and read out the still video signal stored in the memory device to record it on a video floppy disc as well as to output it to external equipment such as a monitor.

Such an electronic still video camera including memory devices is arranged to separate a still image signal supplied from the video camera part or the external equipment such as a still video reproducing apparatus into two signal components: a luminance signal and color-difference signals, input the two signal components as analog signals, convert the analog signals into digital signals, respectively, and write the respective digital signals into the separate memory devices. If the digital signals written into the respective memory devices are to be supplied to external equipment such as a monitor, the color-difference signals of digital form are converted into a digital chrominance signal by balanced modulation before the digital signals outputted from the respective memory devices are subjected to D/A conversion. Then, the digital chrominance signal is subjected to D/A conversion and the obtained analog signal is frequency-multiplexed onto the D/A-converted luminance signal, thereby forming a composite color still image signal. The composite color still image signal is supplied to the desired external equipment. If the two signal components written into the memory devices are to be recorded on a video floppy disc, the luminance signal and the color-difference signals written into the respective memory devices are respectively converted from digital to analog, and the respective analog signals are frequency-modulated. The frequency-modulated luminance signal and the frequency-modulated color-difference signals are frequency-multiplexed to form a recording signal, and the recording signal is recorded on the video floppy disc.

However, such a conventional electronic still video camera has a number of disadvantages. For example, since the digital color-difference signals and the digital chrominance signal are separately formed, separate D/A converters are needed to perform D/A conversion of the respective signals. Since a D/A converter for D/A conversion of the digital luminance signal is also needed, a total of three D/A converters must be incorporated.

As can be seen from the above description, the conventional electronic still video camera needs a complicated arrangement and it has been difficult to reduce the size, weight and cost of the apparatus.

SUMMARY OF THE INVENTION

It is, therefore, an object of the present invention to provide an image signal processing apparatus capable of solving the above-described problems.

Another object of the present invention is to provide an image signal processing apparatus capable of forming a chrominance signal by means of a simple arrangement.

To achieve the above-described objects, according to one aspect of the present invention, there is provided an image signal processing apparatus for processing an image signal, which comprises analog-to-digital converting means for converting analog color-difference signals into digital color-difference signals and outputting the digital color-difference signals, digital signal processing means for receiving the digital color-difference signals outputted from the analog-to-digital converting means, forming a digital chrominance signal by using the received digital color-difference signals, multiplexing the formed digital chrominance signal onto the digital color-difference signals, and outputting a multiplexed digital signal, digital-to-analog converting means for converting the digital signal outputted from the digital signal processing means into an analog signal and outputting the analog signal, and separating means for separating the analog signal outputted from the digital-to-analog converting means into color-difference signals and a chrominance signal and outputting the color-difference signals and the chrominance signal.

Another object of the present invention is to provide an image signal processing apparatus which can be reduced in size and weight.

To achieve the above-described objects, according to one aspect of the present invention, there is provided an image signal processing apparatus for processing an image signal, which comprises signal processing means for receiving color-difference signals, forming a chrominance signal by using the received color-difference signals, multiplexing the formed chrominance signal onto the color-difference signals, and outputting a multiplexed signal, separating means for separating the multiplexed signal outputted from the signal processing means into color-difference signals and a chrominance signal and outputting the color-difference signals and the chrominance signal, outputting means for receiving a luminance signal, multiplexing the chrominance signal outputted from the separating means onto the received luminance signal, and outputting a multiplexed signal, and recording means for receiving the luminance signal, forming a recording image signal by using the received luminance signal and the color-difference signals outputted from the separating means, and recording the formed recording image signal on a recording medium.

Another object of the present invention is to provide an image signal processing apparatus which can be reduced in cost.

To achieve the above-described objects, according to one aspect of the present invention, there is provided an image signal processing apparatus for processing an image signal, which comprises signal processing means for receiving color-difference signals, forming a chrominance signal by using the received color-difference signals, multiplexing the formed chrominance signal onto color-difference signals for one picture from among the received color-difference signals, and outputting a multiplexed signal, separating means for separating the multiplexed signal outputted from the signal processing means into color-difference signals and a chrominance signal and outputting the color-difference signals and the chrominance signal, outputting means for receiving a luminance signal, multiplexing the chrominance signal outputted from the separating means onto the received luminance signal, and outputting a multiplexed signal, and recording means for receiving the luminance signal, forming a recording image signal by using the received luminance signal and the color-difference signals outputted from the separating means, and recording the formed recording image signal on a recording medium.

Another object of the present invention is to provide an image signal processing apparatus which can be simplified in arrangement and reduced in cost.

To achieve the above-described objects, according to another aspect of the present invention, there is provided an image signal processing apparatus for processing an image signal, which comprises signal processing means for receiving color-difference signals, temporarily storing the received color-difference signals, forming a chrominance signal by using the stored color-difference signals, and outputting either one of the formed chrominance signal and the temporarily stored color-difference signals, outputting means for receiving a luminance signal, multiplexing the chrominance signal outputted from the signal processing means onto the received luminance signal, and outputting a multiplexed signal, and recording means for receiving the luminance signal, forming a recording image signal by using the received luminance signal and the color-difference signals outputted from the signal processing means, and recording the formed recording image signal on a recording medium.

Another object of the present invention is to provide an image signal processing apparatus which can instantaneously switch a black-and-white image and a color image therebetween while providing a visual display.

To achieve the above-described objects, according to another aspect of the present invention, there is provided an image signal processing apparatus for processing an image signal, which comprises signal processing means for receiving color-difference signals, multiplexing color burst signals onto the received color-difference signals, and outputting a multiplexed signal, separating means for separating the signal outputted from the signal processing means into color-difference signals and color burst signals and outputting the color-difference signals and the color burst signals, outputting means for receiving a luminance signal, multiplexing the color burst signals outputted from the separating means onto the received luminance signal, and outputting a multiplexed signal, and recording means for receiving the luminance signal, forming a recording image signal by using the received luminance signal and the color-difference signals outputted from the separating means, and recording the formed recording image signal on a recording medium.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
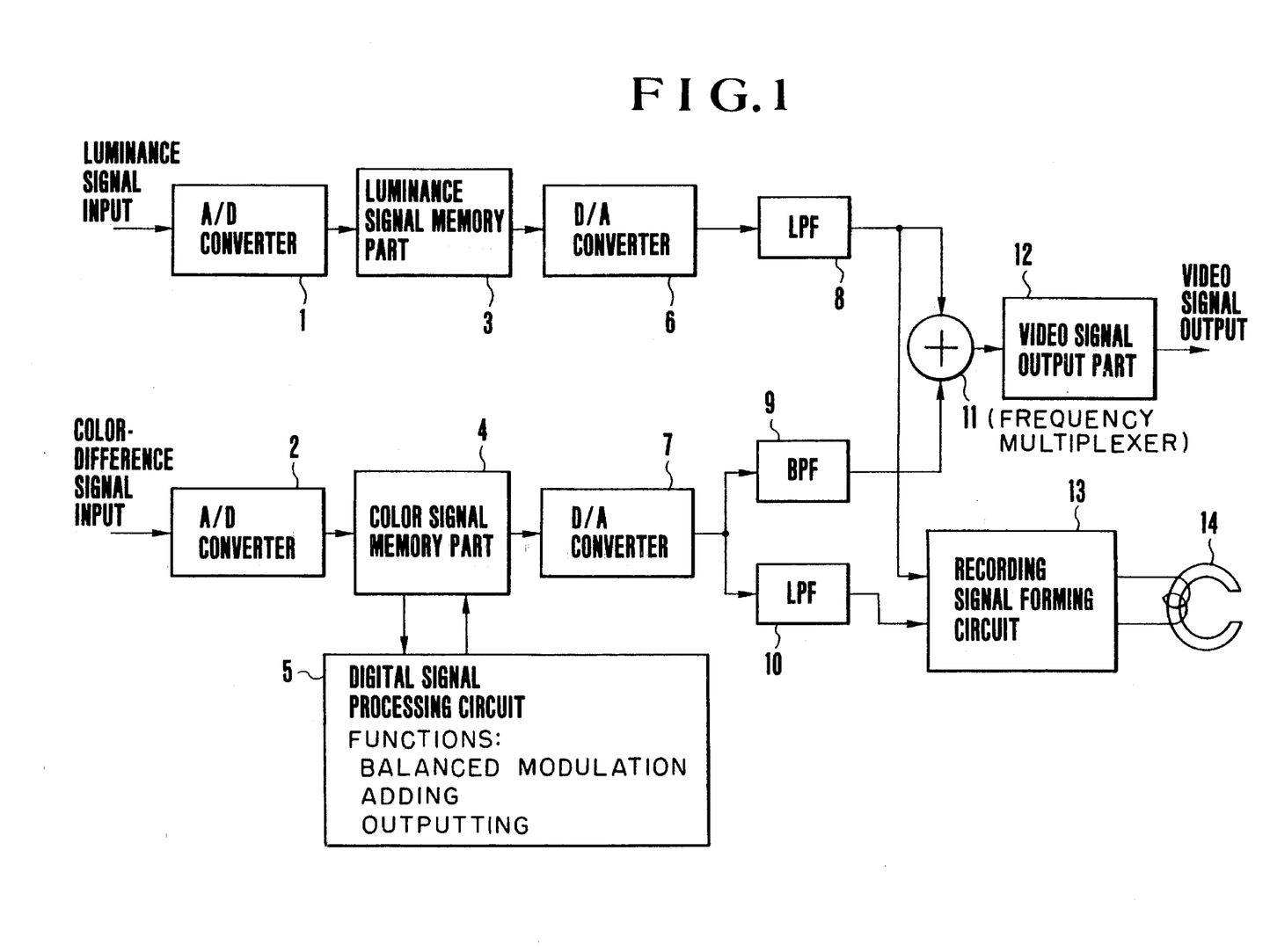
FIG. 1 is a block diagram schematically showing the arrangement of a recording part of an electronic still video camera to which one embodiment of the present invention is applied.

FIG. 1 is a block diagram schematically showing the arrangement of a recording part of an electronic still video camera to which one embodiment of the present invention is applied.

The recording part shown in FIG. 1 includes an A/D converter 1 for converting into a digital signal a luminance signal supplied from a video camera part (not shown) or external equipment (not shown) such as a still video reproducing apparatus, an A/D converter 2 for converting into digital signals color-difference signals supplied from the video camera part or the external equipment such as a still video reproducing apparatus, a luminance signal memory part 3 for storing a digital luminance signal outputted from the A/D converter 1, a color signal memory part 4 for storing digital color-difference signals outputted from the A/D converter 2, a digital signal processing circuit 5 for performing balance modulated modulation of the digital color-difference signals stored in the color signal memory part 4 to form a digital chrominance signal, adding the formed digital chrominance signal to the digital color-difference signals to form a digital sum signal, and supplying the digital sum signal to the color signal memory part 4 for storing purposes, a D/A converter 6 for performing D/A conversion of the digital luminance signal outputted from the luminance signal memory part 3 and outputting an analog luminance signal, a D/A converter 7 for performing D/A conversion of the digital sum signal formed by the addition of the digital chrominance signal to the digital color-difference signals and outputted from the color signal memory part 4, and outputting an analog sum signal, a low-pass filter (LPF) 8 for eliminating a clock component contained in the analog luminance signal outputted from the D/A converter 6, a 3.58-MHz band-pass filter (BPF) 9 for extracting only the chrominance signal from the analog sum signal outputted from the D/A converter 7, a low-pass filter (LPF) 10 having a cutoff frequency of 1.5 MHz for extracting only the color-difference signals from the analog sum signal outputted from the D/A converter 7, a frequency multiplexer 11 for performing frequency multiplexing of the luminance signal outputted from the low-pass filter 8 and the chrominance signal outputted from the band-pass filter 9 to form and output a composite color still image signal, a video signal output part 12 for outputting, in an output impedance of 75Ω, the composite color still image signal supplied from the frequency multiplexer 11 to external equipment such as a monitor (not shown), a recording signal forming circuit 13 for performing frequency modulation of the luminance signal outputted from the low-pass filter 8 and frequency modulation of the color-difference signals outputted from the low-pass filter 10, forming a recording signal by frequency-multiplexing the frequency-modulated signals, and outputting the recording signal, and a magnetic head 14 for recording the recording signal outputted from the recording signal forming circuit 13 on a video floppy disc which is not shown.

Figure 2A:
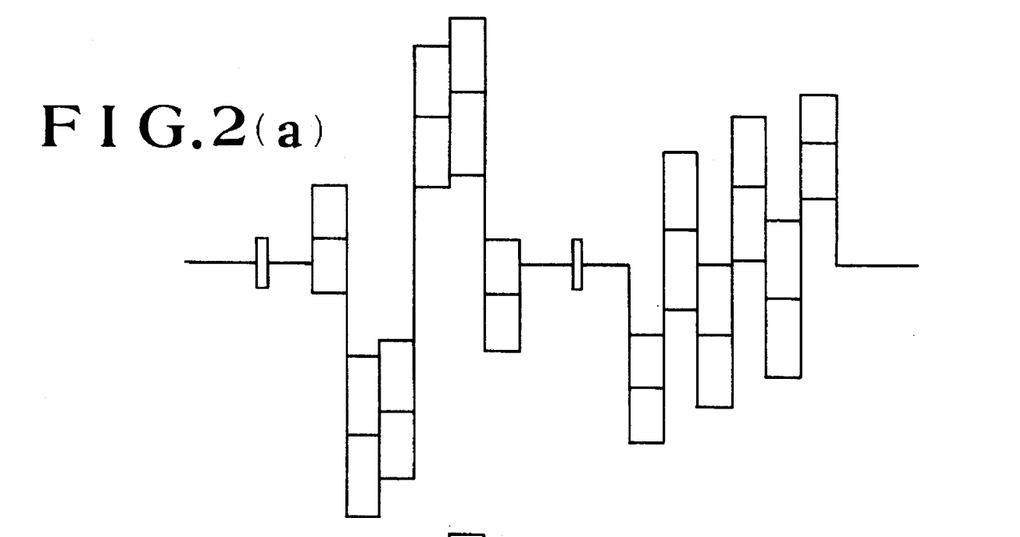
FIGS. 2(a), 2(b) and 2(c) are diagrams showing signal waveforms obtained at individual parts of the apparatus shown in FIG. 1.
Figure 2B:
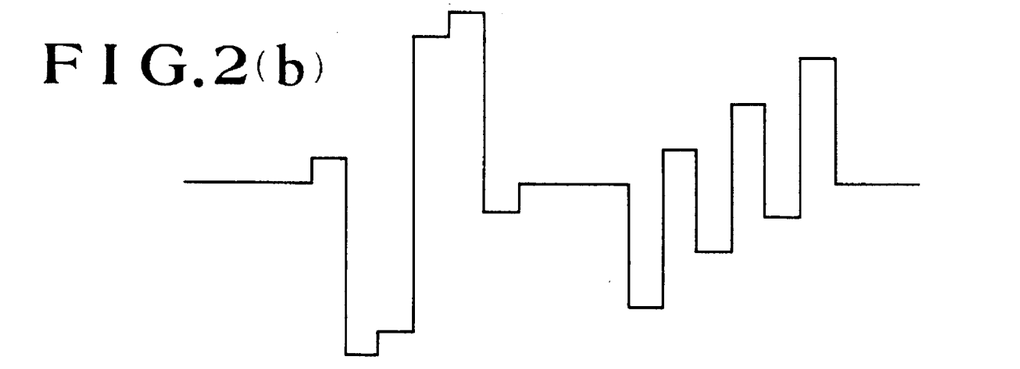
Figure 2C:
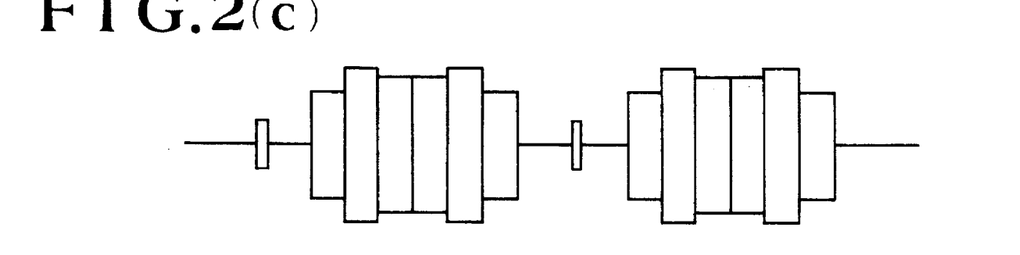

FIGS. 2(a), 2(b) and 2(c) are diagrams showing signal waveforms obtained at individual parts of the apparatus shown in FIG. 1.

FIG. 2(a) shows the signal waveform of the sum signal outputted from the D/A converter 7 of FIG. 1. FIG. 2(b) shows a signal waveform representative of the color-difference signals outputted from the low-pass filter 10. FIG. 2(c) shows the signal waveform of the chrominance signal outputted from the band-pass filter 9.

The operation of the embodiment of the present invention shown in FIG. 1 will be described below in detail with reference to FIGS. 2(a), 2(b) and 2(c).

Referring to FIG. 1, a still image signal supplied from the video camera part (not shown) or the external equipment (not shown) such as a still video reproducing apparatus is separated into a luminance signal and color-difference signals, and the luminance signal is inputted to the A/D converter 1, while the color-difference signals are inputted to the A/D converter 2.

The input luminance signal is converted into a digital luminance signal by the A/D converter 1, and the digital luminance signal outputted from the A/D converter 1 is written into the luminance signal memory part 3. The digital luminance signal stored in the luminance signal memory part 3 is read into the D/A converter 6, in which the digital luminance signal is converted into an analog luminance signal. The analog luminance signal is supplied to the low-pass filter 8, in which a clock component is eliminated from the analog luminance signal. The output of the low-pass filter 8 is supplied to the frequency multiplexer 11 and the recording signal forming circuit 13.

The input color-difference signals are converted into digital color-difference signals by the A/D converter 2, and the digital color-difference signals are written into the color signal memory part 4.

The digital color-difference signals stored in the color signal memory part 4 are supplied to the digital signal processing circuit 5. The digital signal processing circuit 5 performs balanced modulation of the digital color-difference signals stored in the color signal memory part 4 to form a digital chrominance signal, then adds the formed digital chrominance signal to the digital color-difference signals to form a digital sum signal, and then supplies the digital sum signal to the color signal memory part 4 for storing purposes.

The digital sum signal stored in the color signal memory part 4 is read into the D/A converter 7. The D/A converter 7 converts the digital sum signal into an analog sum signal such as that shown in FIG. 2(a) and outputs the analog sum signal.

The analog sum signal outputted from the D/A converter 7 is supplied to the band-pass filter 9, and only a chrominance signal such as that shown in FIG. 2(c) is extracted from the analog sum signal by passing it through the band-pass filter 9. The chrominance signal is supplied to the frequency multiplexer 11.

In the frequency multiplexer 11, the luminance signal outputted from the low-pass filter 8 and the chrominance signal outputted from the band-pass filter 9 are frequency-multiplexed to form a composite color still image signal. The composite color still image signal is outputted to external equipment (not shown) such as a monitor in an output impedance of 75Ω by the video signal output part 12.

In the meantime, the sum signal outputted from the D/A converter 7 is also supplied to the low-pass filter 10 having a cutoff frequency of 1.5 MHz. Only color-difference signals such as those shown in FIG. 2(b) are extracted from the sum signal by passing the sum signal through the low-pass filter 10. The color-difference signals are supplied to the recording signal forming circuit 13 together with the luminance signal outputted from the low-pass filter 8.

In the recording signal forming circuit 13, the luminance signal and the color-difference signals are each frequency-modulated in accordance with a still-video recording format, and the obtained signals are frequency-multiplexed to form a recording signal. The recording signal is recorded on a video floppy disc by the magnetic head 14.

In the recording part of the electronic still video camera which is arranged in the above-described manner, it is possible to record the supplied still image signal on the video floppy disc while displaying the contents of the supplied still image signal on the monitor so that an operator can confirm them. In addition, when compared to the conventional arrangement, since the number of D/A converters can be reduced as shown in FIG. 1, a simple arrangement can be achieved to realize reductions in the size, weight and cost of the apparatus.

The above-described embodiment is arranged so that the digital signal processing circuit 5 performs balanced modulation of digital color-difference signals to form a digital chrominance signal, then adds the formed digital chrominance signal to the digital color-difference signals to form a digital sum signal, and then supplies the digital sum signal to a single D/A converter. In this arrangement, an analog chrominance signal and analog color-difference signals are formed from the digital color-difference signals stored in the color signal memory part 4, and such analog signals are outputted. However, it is not always necessary to add the digital chrominance signal to the digital color-difference signals to form the digital sum signal, and other arrangements may be employed.

In one arrangement, only during a period for recording a still image signal on a video floppy disc (the time period required to record a still image signal for one frame on a video floppy disc in the electronic still video camera is approximately 35 msec), the digital signal processing circuit 5 performs addition of a digital chrominance signal to digital color-difference signals and the digital sum signal is outputted from the color signal memory part 4 in a manner similar to that performed in the above-described embodiment. However, during a period in which no still image signal is being recorded on the video floppy disc while the composite color still image signal is being outputted from the video signal output part 12 to the monitor or other external equipment, the digital signal processing circuit 5 does not perform addition of the digital chrominance signal to the digital color-difference signals and only the digital chrominance signal is outputted from the color signal memory part 4. With this arrangement, it is possible to reduce the power consumption of the apparatus.

In another arrangement, even during the period for recording the still image signal on the video floppy disc, the digital signal processing circuit 5 does not perform addition of the digital chrominance signal to the digital color-difference signals and only the digital color-difference signals are outputted from the color signal memory part 4. During the period in which no still image signal is being recorded on the video floppy disc while the composite color still image signal is being outputted from the video signal output part 12 to the monitor or other external equipment, the digital signal processing circuit 5 does not perform addition of the digital chrominance signal to the digital color-difference signals and only the digital chrominance signal is outputted from the color signal memory part 4. With this arrangement, it is possible to reduce the power consumption of the apparatus to a further extent.

In this arrangement, during the period for recording the still image signal on the video floppy disc, a black-and-white still image signal having no color subcarrier is supplied from the video signal output part 12 to the monitor. However, since the time period required to record a still image signal for one frame on a video floppy disc in the electronic still video camera is as short as approximately 35 msec, such a black-and-white still image signal is visually substantially imperceptible.

It is known that if the signal supplied from the video signal output part 12 during the period of a recording operation is a black-and-white still image signal consisting of a luminance signal as described above, a particular type of monitor fails to instantaneously provide a color display when the image signal outputted to the monitor is switched from the black-and-white still image signal to the composite color still image signal.

Figure 3A:
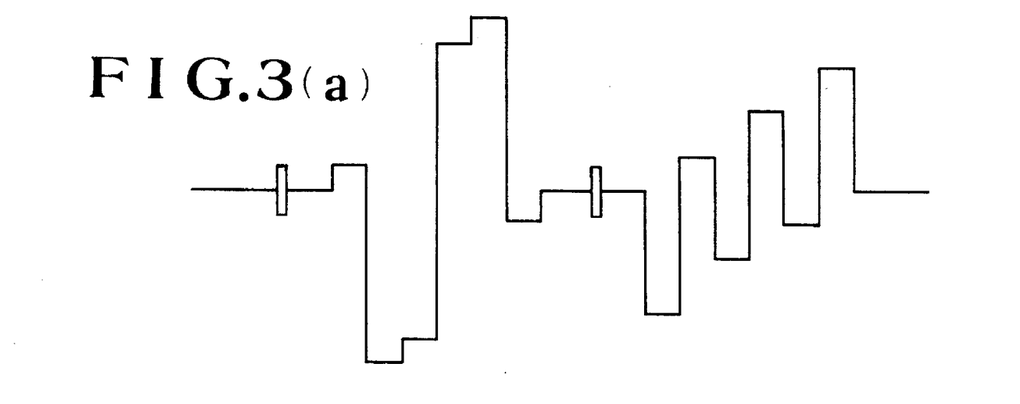
FIGS. 3(a), 3(b) and 3(c) are diagrams showing signal waveforms obtained at individual parts of another example of the apparatus shown in FIG. 1.
Figure 3B:
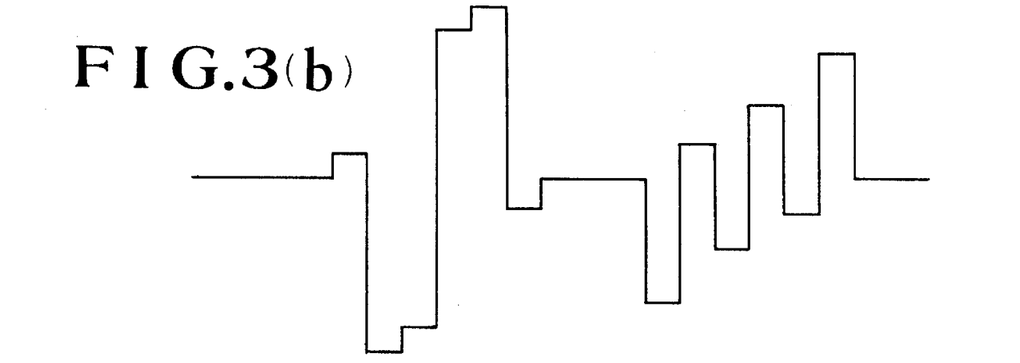
Figure 3C:
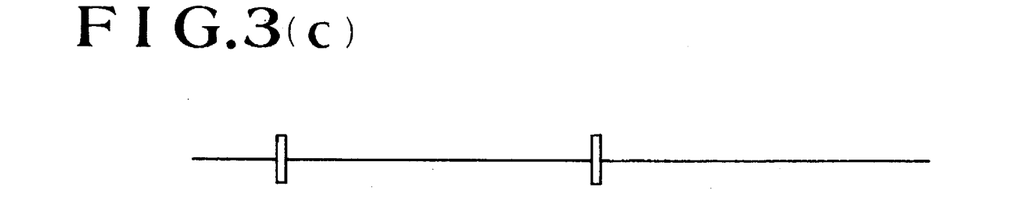

To cope with the problem, the digital signal processing circuit 5 may be arranged so that during the period for recording the still image signal on the video floppy disc in the above-described operation, color burst signals are generated and added to the digital color-difference signals outputted from the color signal memory part 4 in the digital signal processing circuit 5, as shown in FIG. 3(a). The digital color-difference signals having the added color burst signals are subjected to D/A conversion by the D/A converter 7, and the analog color-difference signals are formed into the color-difference signals shown in FIG. 3(b) by being passed through the low-pass filter 10. At the same time, the analog color-difference signals are passed through the band-pass filter 9, and the color burst signals shown in FIG. 3(c) are extracted from the analog color-difference signals and supplied to the frequency multiplexer 11. The frequency multiplexer 11 multiplexes the color burst signals to the luminance signal supplied from the low-pass filter 8 and outputs the obtained luminance signal as a black-and-white still image signal. The black-and-white still image signal is supplied to the monitor through the video signal output part 12. Accordingly, when the image signal supplied from the video signal output part 12 to the monitor is switched from the black-and-white still image signal to the composite color still image signal, the monitor can accurately follow the switching operation to instantaneously display a color image.

As can be seen from the foregoing description, in each of the arrangements according to the present embodiment, analog color-difference signals and a chrominance signal can be formed from digital color-difference signals by means of a single D/A converter in a recording part of an electronic still video camera provided with memory devices. Accordingly, a simple arrangement can be achieved to realize reductions in the size, weight and cost of the apparatus.

As is apparent from the foregoing description, in accordance with the present embodiment, it is possible to provide an image signal processing apparatus having a simple arrangement which can be easily reduced in size, weight and cost.

What is claimed is:

1. An image signal processing apparatus for processing an image signal, comprising:
    (A) analog-to-digital converting means for converting an analog color difference signal into digital color difference signal and outputting the digital color difference signal;
    (B) digital signal processing means for receiving the digital color difference signal outputted from said analog-to-digital converting means, forming a digital color signal by using the received digital color difference signal, multiplexing the formed digital color signal onto the received digital color difference signal, and outputting a multiplexed digital signal;
    (C) digital-to-analog converting means for converting the digital signal outputted from said digital signal processing means into an analog signal and outputting the analog signal; and
    (D) separating means for separating the analog signal outputted from said digital-to-analog converting means into an analog color signal and an analog color difference signal and outputting the analog color difference signal and the analog color signal.

2. An image signal processing apparatus according to claim 1, wherein said separating means includes a first filter circuit for separating the analog color difference signal from the analog signal outputted from said digital-to-analog converting means and outputting the analog color difference signal and a second filter circuit for separating the analog color signal from the analog signal and outputting the analog color signal.

3. An image signal processing apparatus according to claim 1, wherein said digital signal processing means includes memory means for storing the digital color difference signal outputted from said analog-to-digital converting means, said digital signal processing means being arranged to form the digital color signal by using the digital color difference signal stored in said memory means, multiplex the formed digital color signal onto the digital color difference signal stored in said memory means, and store the multiplexed signal in said memory means.

4. An image signal processing apparatus according to claim 1, wherein said digital signal processing means includes memory means for storing the digital color difference signal outputted from said analog-to-digital converting means and adding means for forming the digital color signal by using the digital color difference signal stored in said memory means, adding the formed digital color signal to the digital color difference signal stored in said memory means, and supplying a digital sum signal to said memory means.

5. An image signal processing apparatus according to claim 4, wherein said memory means is arranged to store the digital color difference signal for one picture which are outputted from said analog-to-digital converting means.

6. An image signal processing apparatus for processing an image signal, comprising:
    (A) signal processing means for receiving a color difference signal, forming a color signal by using the received color difference signal, multiplexing the formed color signal onto the received color difference signal, and outputting a multiplexed signal;
    (B) separating means for separating the multiplexed signal outputted from said signal processing means into a color difference signal and a color signal and outputting the color difference signal and the color signal;
    (C) outputting means for receiving the luminance signal, multiplexing the color signal outputted from said separating means onto the received luminance signal, and outputting a multiplexed signal; and
    (D) recording means for receiving the luminance signal, forming a recording image signal by using the received luminance signal and the color difference signal outputted from said separating means, and recording the formed recording image signal on a recording medium.

7. An image signal processing apparatus according to claim 6, wherein said separating means includes a first filter circuit for separating the color difference signal from the multiplexed signal outputted from said signal processing means and outputting the color difference signal and a second filter circuit for separating the color signal from the multiplexed signal and outputting the color signal.

8. An image signal processing apparatus according to claim 6, wherein said signal processing means includes memory means for storing the color difference signal, said signal processing means being arranged to temporarily store the color difference signal in said memory means, form the color signal by using the color difference signal stored in said memory means, multiplex the formed color signal onto the color difference signal stored in said memory means, and store the multiplexed signal in said memory means.

9. An image signal processing apparatus according to claim 6, wherein said signal processing means includes memory means for storing the color difference signal and adding means for forming the color signal by using the color difference signal stored in said memory means, adding the formed color signal to the color difference signal stored in said memory means, and supplying a sum signal to said memory means.

10. An image signal processing apparatus according to claim 9, wherein said memory means is arranged to store color difference signal for one picture.

11. An image signal processing apparatus for processing an image signal, comprising:

(A) signal processing means for receiving a color difference signal, forming a color signal by using the received color difference signal, multiplexing the formed color signal onto the received color difference signal for one picture from among the received color difference signal, and outputting a multiplexed signal;

(B) separating means for separating the multiplexed signal outputted from said signal processing means into color difference signal and a color signal outputting the color difference signal and the color signal;

(C) outputting means for receiving a luminance signal, multiplexing the color signal outputted from said separating means onto the received luminance signal, and outputting a multiplexed signal; and (D) recording means for receiving the luminance signal, forming a recording image signal by using the received luminance signal and the color difference signal outputted from said separating means, and recording the formed recording image signal on a recording medium.

12. An image signal processing apparatus according to claim 11, wherein said separating means includes a first filter circuit for separating the color difference signal from the multiplexed signal outputted from said signal processing means and outputting the color difference signal and a second filter circuit for separating the color signal from the multiplexed signal and outputting the color signal.

13. An image signal processing apparatus according to claim 11, wherein said signal processing means includes memory means for storing the color difference signal for one picture, said signal processing means being arranged to temporarily store the received color difference signal for one picture in said memory means, form a color signal for one picture by using the color difference signal for one picture stored in said memory means, multiplex the formed color signal for one picture onto the color difference signal for one picture stored in said memory means, and store the multiplexed signal in said memory means.

14. An image signal processing apparatus according to claim 11, wherein said signal processing means includes memory means for storing the color difference signal for one picture and adding means for forming the color signal for one picture by using the color difference signal for one picture stored in said memory means, adding the formed color signal for one picture to the color difference signal for one picture stored in said memory means, and supplying a sum signal to said memory means.

15. An image signal processing apparatus for processing an image signal, comprising:

(A) signal processing means for receiving a color difference signal, temporarily storing the received color difference signal, forming a color signal by using the stored color difference signal, and outputting either one of the formed color signal and the temporarily stored color difference signal;

(B) outputting means for receiving a luminance signal, multiplexing the color signal outputted from said signal processing means onto the received luminance signal, and outputting a multiplexed signal; and (C) recording means for receiving the luminance signal, forming a recording image signal by using the received luminance signal and the color difference signal outputted from said separating means, and recording the formed recording image signal on a recording medium.

16. An image signal processing apparatus according to claim 15, wherein said signal processing means includes memory means for storing the color difference signal for one picture, said signal processing means being arranged to temporarily store the received color difference signal for one picture in said memory means, form a color signal for one picture by using the color difference signal for one picture stored in said memory means, and output either one of the formed color signal for one picture and the color difference signal for one picture stored in said memory means.

17. An image signal processing apparatus for processing an image signal, comprising:

(A) signal processing means for receiving a color difference signal, multiplexing a color burst signal onto the received color difference signal, and outputting a multiplexed signal;

(B) separating means for separating the signal outputted from said signal processing means into the color difference signal and the color burst signal and outputting the color difference signal and the color burst signal;

(C) outputting means for receiving a luminance signal, multiplexing the color burst signal outputted from said separating means onto the received luminance signal, and outputting a multiplexed signal; and (D) recording means for receiving the luminance signal, forming a recording image signal by using the received luminance signal and the color difference signal outputted from said separating means, and recording the formed recording image signal on a recording medium.

18. An image signal processing apparatus according to claim 17, wherein said separating means includes a first filter circuit for separating the color difference signal from the signal outputted from said signal processing means and outputting the color difference signal and a second filter circuit for separating the color burst signal from the signal outputted from said signal processing means and outputting the color burst signal.

19. An image signal processing apparatus according to claim 17, wherein said signal processing means includes memory means for storing the color difference signal for one picture, said signal processing means being arranged to temporarily store the received color difference signal for one picture in said memory means, multiplex the color burst signal onto the color difference signal for one picture stored in said memory means, and store a multiplexed signal in said memory means.

20. An image signal processing apparatus according to claim 17, wherein said signal processing means includes memory means for storing the color difference signal for one picture and adding means for adding the color burst signal to the color difference signal for one picture stored in said memory means and supplying a sum signal to said memory means.

* * * * *

UNITED STATES PATENT AND TRADEMARK OFFICE
CERTIFICATE OF CORRECTION

PATENT NO. :  5,546,133

DATED      :  August 13, 1996

INVENTOR(S):  Yoshihiro Honma

It is certified that error appears in the above-identified patent and that said Letters Patent is hereby corrected as shown below:

On the cover page, Item [54], before "IMAGE" insert -- COLOR-- and before "PROCESSING" insert -- DIGITAL --.

Col. 1, line 1, before "IMAGE" insert -- COLOR-- and before "PROCESSING" insert -- DIGITAL --.

Col. 4, line 26, delete "modulated".

Signed and Sealed this

Twenty-fifth Day of March, 1997

Attest:

BRUCE LEHMAN

*Attesting Officer*   *Commissioner of Patents and Trademarks*